United States Patent [19]
Takei et al.

[11] Patent Number: 4,753,375
[45] Date of Patent: Jun. 28, 1988

[54] VISCOUS SUBSTANCE APPLYING APPARATUS

[75] Inventors: Shinzo Takei; Katsutoshi Miyahigashi, both of Tokyo, Japan

[73] Assignee: Sony Corporation, Tokyo, Japan

[21] Appl. No.: 13,557

[22] Filed: Feb. 11, 1987

[30] Foreign Application Priority Data

Feb. 12, 1986 [JP] Japan .................................. 61-28489

[51] Int. Cl.[4] ............................................... G01F 11/28
[52] U.S. Cl. ..................................... 222/447; 222/450; 222/510; 137/614.21
[58] Field of Search ............... 222/450, 447, 445, 453, 222/540, 510, 559, 545, 509, 501, 481; 137/614.21; 118/620

[56] References Cited

U.S. PATENT DOCUMENTS 2,283,230 5/1942 Rogers ................................ 222/447
2,852,170 9/1958 Reynolds ............................ 222/447

*Primary Examiner*—Joseph J. Rolla
*Assistant Examiner*—Kenneth Noland
*Attorney, Agent, or Firm*—Hill, Van Santen, Steadman & Simpson

[57] ABSTRACT

A viscous substance applying apparatus equipped with a nozzle, for use, for example, in applying frit to the sealing part of a funnel in manufacturing a cathode-ray tube. The nozzle is provided with two valve elements disposed in a frit chamber formed in a nozzle body. One of the valve elements, for shutting a frit outlet, is moved inward away from the frit outlet, applying suction to the frit contained in the frit chamber, at the start of the frit applying operation, while the other valve element for shutting a frit inlet is moved outward toward the frit inlet in ending the frit applying operation; consequently, the undesirable drip of the frit at the star and at the end of the frit applying operation is obviated, and hence the frit is applied regularly in a predetermined width to the sealing part of the funnel.

3 Claims, 5 Drawing Sheets

VISCOUS SUBSTANCE APPLYING APPARATUS

BACKGROUND OF THE INVENTION

1. Field of the Invention:

The present invention relates to apparatus for applying a viscous substance for use, for example, in applying frit to the sealing part of a funnel in manufacturing a cathode-ray tube and, more specifically, to a nozzle for such an apparatus.

2. Description of the Prior Art:

Nozzles for a conventional viscous substance applying apparatus for use, for example, in applying frit to the sealing part of the funnel of a cathode-ray tube are shown in FIGS. 4 and 5.

The nozzle 1 of FIG. 4 is provided with a valve element 4 which opens or shuts only the frit inlet 3 of a frit chamber 2. The valve element 4 is controlled for opening or closing the frit inlet 3 by pneumatically raising or lowering a piston 6 fitted in a cylinder 5 and connected to the valve element 4.

The nozzle 1 of FIG. 5 is provided with a valve element 8 which opens or shuts only the frit outlet 7 of a frit chamber 2. In FIGS. 4 and 5, indicated at 9 and 10 are air inlet-outlet ports, and at II is a frit inlet port.

After applying the frit to the sealing part of the funnel, a fluorescent screen and a metal backing are formed, then the funnel is joined to a panel mounted with a color selection electrode, then an electron gun is attached to the funnel, and then the funnel is evacuated to complete a cathode-ray tube.

In applying the frit with the nozzle 1 of FIG. 4, the valve element 4 is moved downward to open the frit inlet 3 at the start of discharging the frit; consequently, a portion of the frit remaining in the frit chamber 2 is pushed out from the nozzle 1 by the downward movement of the valve element 4, so that the frit is unavoidably applied to the sealing part of a funnel in a width greater than the desired predetermined width. At the end of discharging the frit, the valve element 4 is moved upward to close the frit inlet 3. Therefore, the frit is sucked back into the frit chamber 2, and hence the width of the frit applied to the sealing part of the funnel does not change. FIG. 6 illustrates a mode of spread of the frit 13 applied to the sealing part 12 with the nozzle 1 of FIG. 4. Since an excessive amount of the frit is discharged at the start of applying the frit, the frit spreads in a width wider than the predetermined width at the frit application starting position 14. The spread of the frit 13 at the frit application ending position 15 is normal.

In applying the frit with the nozzle 1 of FIG. 5, the valve element 8 is moved upward to open the frit outlet 7 at the start of discharging the frit 13, and hence the frit 13 is applied in an appropriate width at the frit application starting position 16 as illustrated in FIG. 7. However, since the valve element 8 is moved downward at the end of discharging the frit to close the frit outlet 7, a portion of the frit 13 remaining in the frit chamber 2 is discharged excessively, and hence the frit 13 spreads in a width greater than the predetermined width at the frit application ending position 17 as illustrated in FIG. 7.

Thus, it is difficult to control the width of spread of the frit correctly at the start or at the end of frit application when such conventional nozzles are used. Particularly, when the manufacturing condition requires overlapping the frit application starting position and the frit application ending position, the width of the overlapping part necessarily becomes greater than the predetermined width.

SUMMARY OF THE INVENTION

Accordingly, it is an object of the present invention to provide a viscous substance applying apparatus which eliminates the above-mentioned disadvantages of the conventional viscous substance applying apparatus.

In order to achieve the object of the invention, the present invention provides a viscous substance applying apparatus for use, for example, in manufacturing a cathoderay tube, comprising a nozzle coaxially provided with a valve element for opening or shutting the viscous substance inlet, and a valve element for opening or shutting the viscous substance outlet. The former valve element corresponds to that of the nozzle of FIG. 4, while the latter valve element corresponds to that of the nozzle of FIG. 5. Thus, the nozzle according to the present invention provides the respective valve elements of the two abovementioned conventional nozzles rearranged and operative in combination. As a result of the applicants' novel arrangement the nozzle of the present invention is capable of applying a viscous substance in a predetermined width without discharging an excessive amount of the viscous substance at the start or at the end of viscous substance application.

DESCRIPTION OF THE PREFERRED EMBODIMENT

Figure 3:
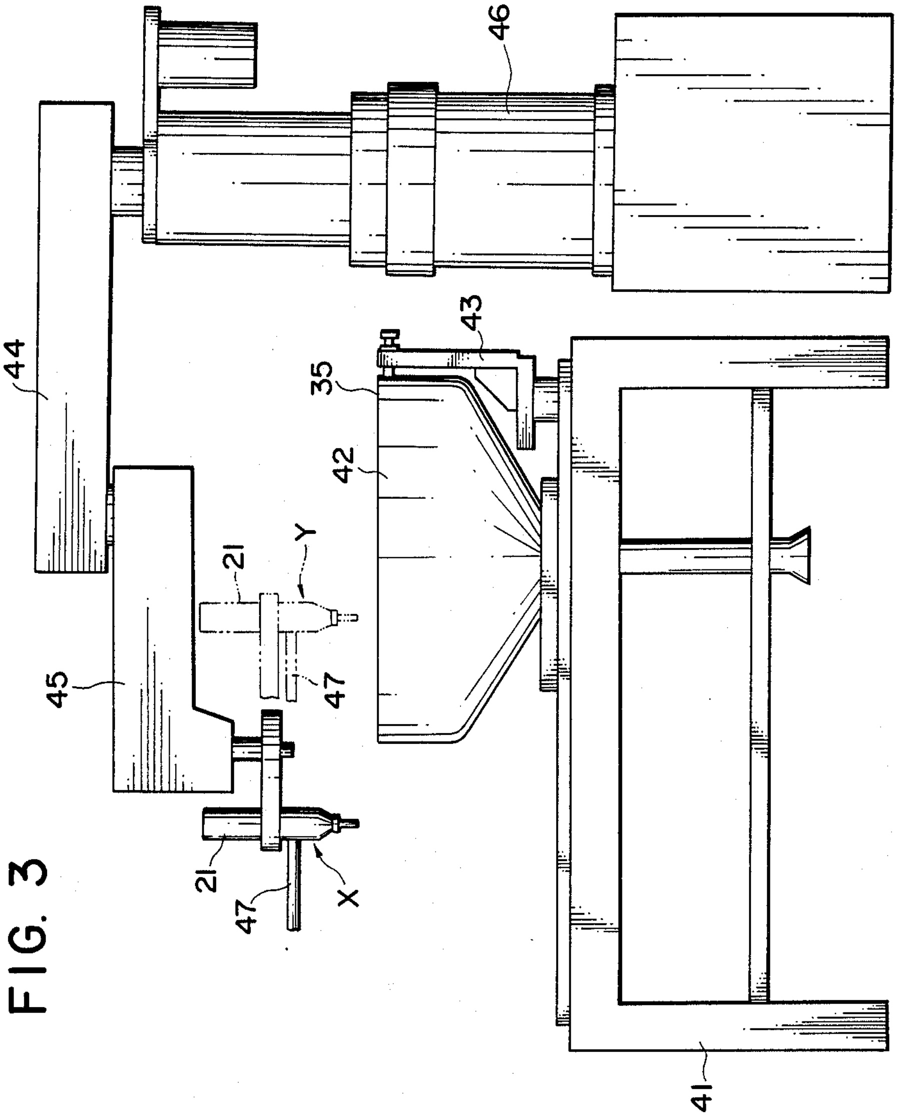
FIG. 3 is a schematic side elevational view of a frit applying apparatus.
Figure 4:
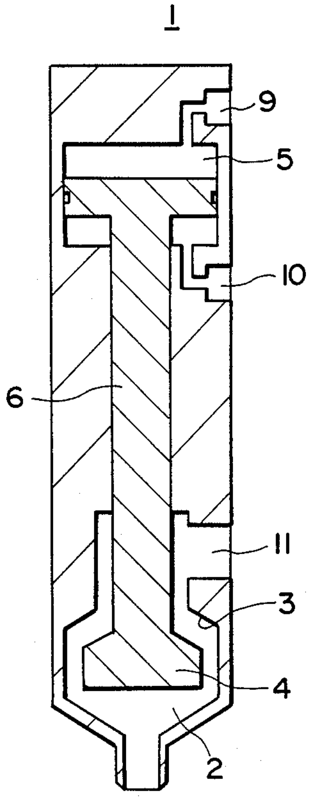
FIGS. 4 and 5 are longitudinal sectional views of conventional nozzles, respectively.
Figure 5:
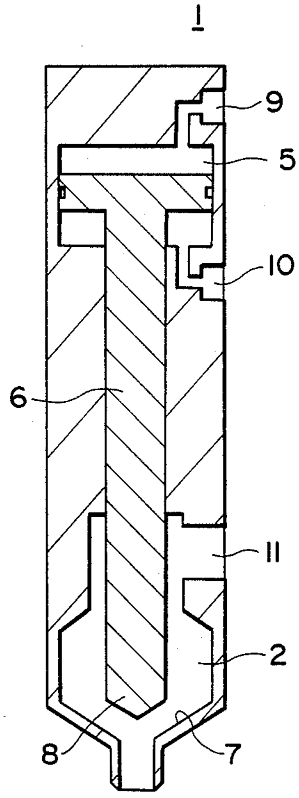

FIG. 3 illustrates a viscous substance applying apparatus embodying the present invention for use in manufacturing cathode-ray tubes. A table 41 is provided with an adapter mechanism for holding various types of funnels. A funnel 42 is held by a holder 43. A nozzle 21 is held by a holding device 46 comprising swivel arms 44 and 45. After locating the nozzle 21 at a predetermined position, the swivel arms 44 and 45 are turned so that the nozzle 21 travels along the sealing part 35 of the funnel 42 to apply frit 36 to the sealing part 35. The frit 36 is supplied through a frit supply pipe 47 to the nozzle 21.

Figure 1A:
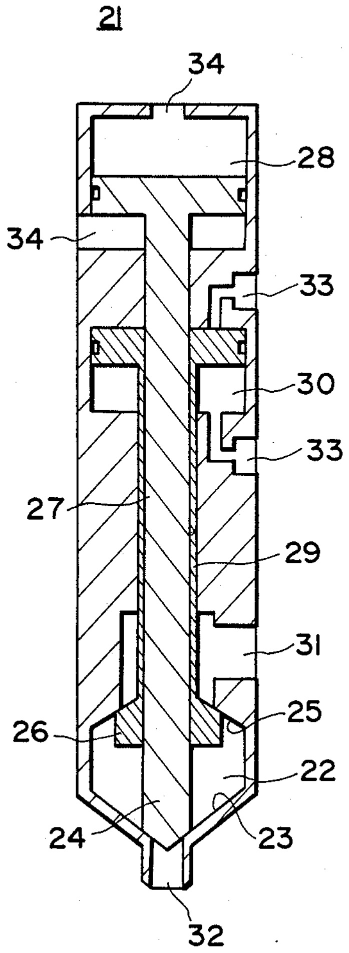
FIGS. 1A to 1D are longitudinal sectional views of a nozzle in a preferred embodiment, according to the present invention, showing the constitution and modes of operation of the same.

As illustrated in FIG. 1A, the nozzle 21 comprises a nozzle body, a lower valve element 24 seated on an outlet valve seat 23 formed in a frit chamber 22, an upper valve element 26 disposed coaxially with the lower valve element 24 and seated on an inlet valve seat 25 formed in the frit chamber 22, a first piston 27 formed at the upper end of the lower valve element 24 and slidably fitted in a first cylinder 28 formed in the nozzle body, and a second piston formed at the upper end of the upper valve element 26 and slidably fitted in a second cylinder 30 formed in the nozzle body. The nozzle body has a frit supply port 31, a frit outlet 32, two air supply-discharge ports 34 for the first cylinder 28, and two air supply-discharge ports 33 for the second cylinder 30.

The manner of operation of the nozzle 21 will be described hereinafter.

First, referring to FIG. 1A, the nozzle 21 is located at a position X (FIG. 3) before starting frit applying operation, and the upper and lower valve elements 26 and 24 are seated on the inlet valve seat 25 and the outlet valve seat 23, respectively, to shut the frit chamber 22.

Figure 1B:
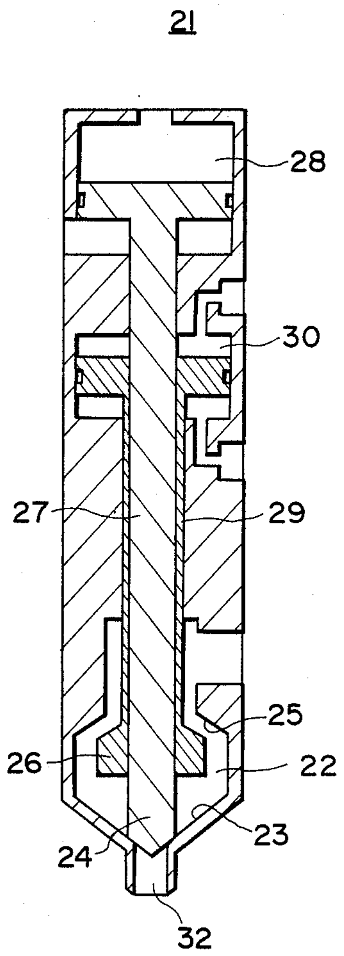

Then, the nozzle 21 is moved to a position Y (FIG. 3), namely, a frit application starting positon, and air is supplied into the second cylinder 30 through the upper air supply-discharge port 33 to urge the second piston 29 downward so that the upper valve element 26 is separated from the inlet valve seat 25 as illustrated in FIG. 1B.

Figure 1C:
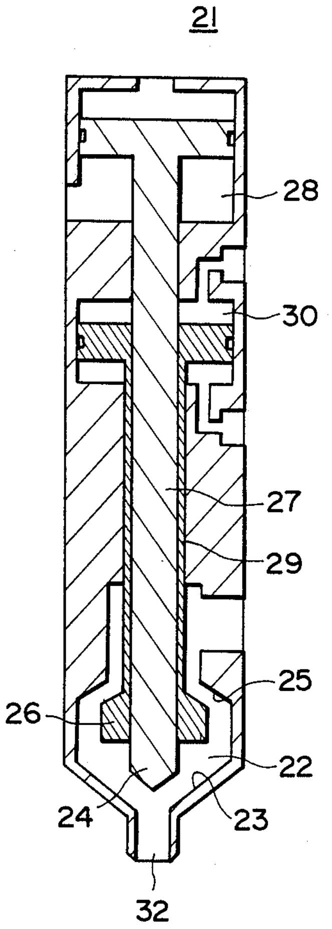

Then, as illustrated in FIG. 1C, air is supplied into the first cylinder through the lower air supply-discharge port 34 to urge the first piston 27 upward so that the lower valve element 24 is separated from the outlet valve seat 23. Then, the frit is supplied to the nozzle 21 through the frit supply port 31. Since the lower valve element 24 is raised at the start of the frit applying operation applying suction to the frit contained in the frit chamber 22 instead of applying pressure to the same, there is no possibility that an excessive amount of the frit is momentarily discharged at the start of the frit applying operation. After the nozzle 21 has thus been opened, the swivel arms 44 and 45 are turned properly so that the nozzle 21 is moved along the sealing part 35 of the funnel 42 to apply the frit 36 to the sealing part 35.

Figure 1D:
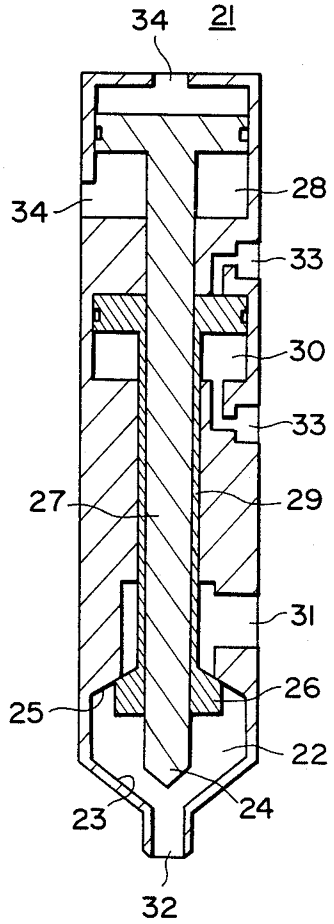

As illustrated in FIG. 1D, first, the second piston 29 is moved upward to seat the upper valve element 26 on the inlet valve seat 25 in order to end discharging the frit. Since the upper valve element is raised at the end of the frit applying operation applying suction to the frit contained in the frit chamber 22, there is no possibility that an excessive amount of the frit is discharged temporarily at the end of the frit applying operation. Then, the nozzle 21 is returned to the position X, and then the upper piston 27 is moved downward so that the lower valve element 24 is seated on the outlet valve seat 23 to close the frit outlet 32 as illustrated in FIG. 1A.

Figure 2:
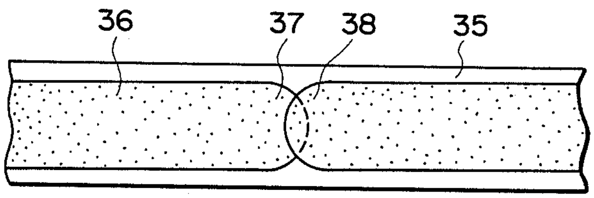
FIG. 2 is a partial plan view of a state of spread of frit applied with the nozzle of the present invention.
Figure 6:
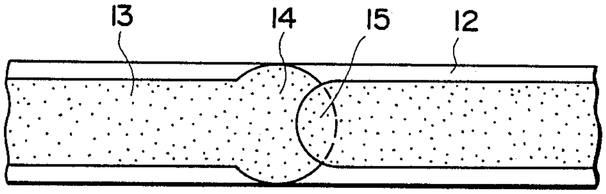
FIGS. 6 and 7 are partial plan views showing states of spread of frit applied with the nozzles of FIGS. 4 and 5, respectively.
Figure 7:
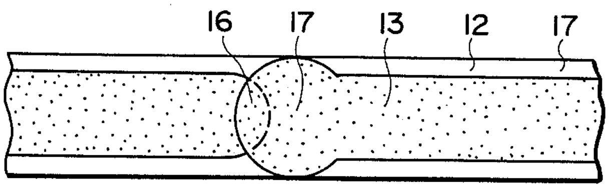

As obvious from FIG. 2, showing a state of spread of the frit 36 applied to the sealing part 35 of the funnel 42 with the nozzle 21, the frit 36 is applied in a predetermined desired width both at the start and at the end of the frit applying operation as indicated at 37 and 38, and thereby the application of an excessive amount of the frit in a momentarily excessive width as illustrated in FIGS. 6 and 7 is obviated.

In the practical frit applying apparatus as shown in FIG. 3, the upper and lower valve elements 26 and 24 are controlled automatically by controlling air supply to the second and first cylinders 30 and 28.

As apparent from the foregoing description, according to the present invention, there is no possibility that an excessive amount of the viscous substance is discharged at the start and at the end of the viscous substance discharging operation, and hence the viscous substance spread in a predetermined width even when the starting and ending ends of the applied viscous substance overlap each other.

Although the invention has been described in its preferred form with a certain degree of particularity. It is to be understood that many variations and changes are possible in the invention without departing from the scope thereof.

We claim as our invention:

1. A viscous substance applying apparatus provided with a nozzle comprising: a nozzle body having a first cylinder provided with fluid supply-discharge ports, a second cylinder provided with fluid supply-discharge ports, a viscous substance chamber provided with a first viscous substance inlet valve seat, a second viscous substance outlet valve seat, a viscous substance supply port, and a viscous substance outlet; a first valve element disposed within the viscous substance chamber so as to be seated on or separated from the first valve seat; a second valve element disposed within the viscous substance chamber coaxially with said first valve element so as to be seated on or separated from the second valve seat; a first piston formed at the upper end of the first valve element and slidably fitted in a first cylinder; and a second piston formed at the upper end of the second valve element and slidably fitted in a second cylinder, and means sequentially operating said pistons during application of the viscous substance to first open said first valve element, then said second valve element, and then close said first valve element and lastly after application close said second valve element.

2. The structure of claim 1 wherein said first and second valve seats and valve elements are coaxially aligned.

3. The structure of claim 2 wherein the first valve element is concentric with and surrounds said second valve element.

* * * * *